May 12, 1964    G. R. NORBERG    3,133,263
DIRECTION INDICATORS
Filed April 27, 1960    2 Sheets-Sheet 1
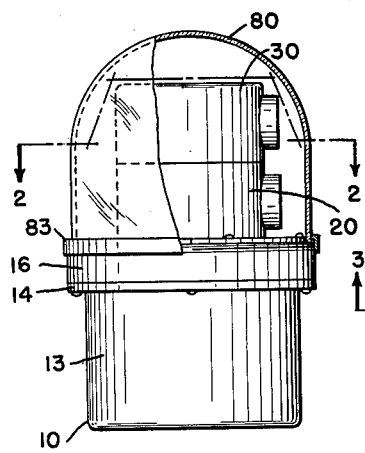
FIG. 1
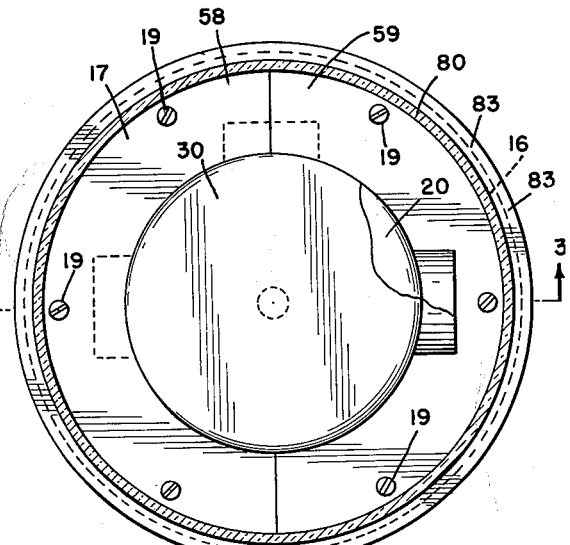
FIG. 2
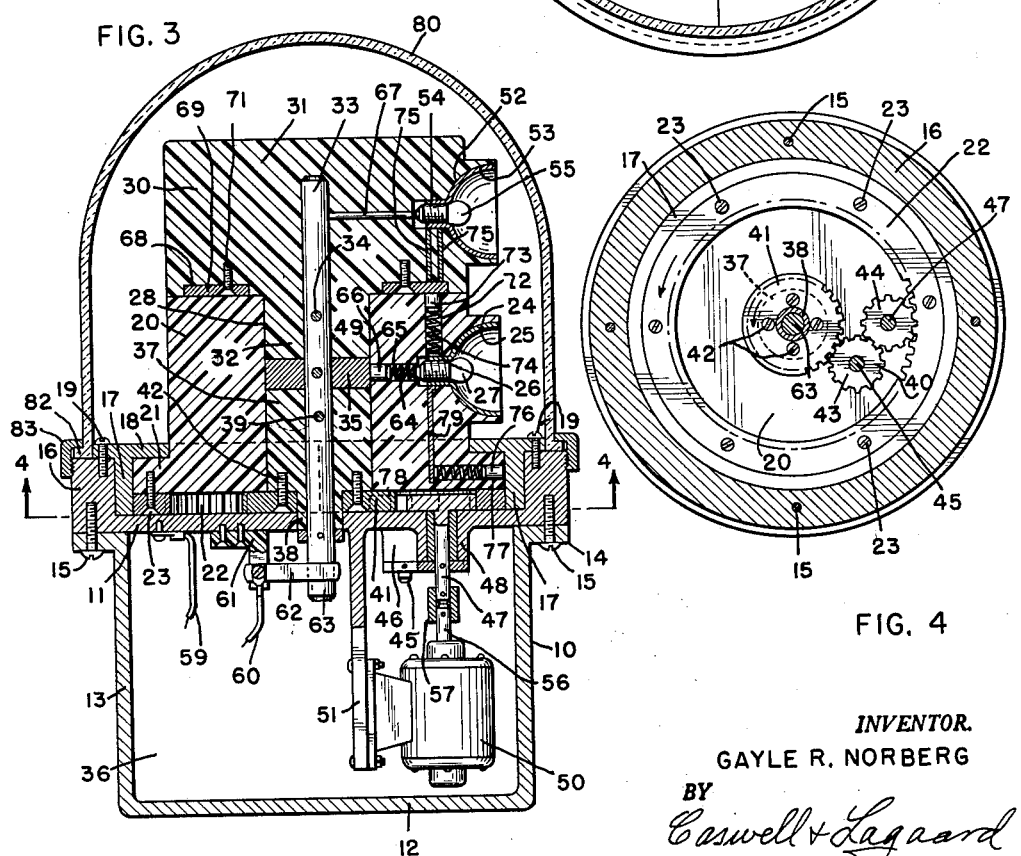
FIG. 3
FIG. 4
INVENTOR.
GAYLE R. NORBERG
BY
Caswell & Lagaard
ATTORNEYS May 12, 1964
G. R. NORBERG
3,133,263
DIRECTION INDICATORS
Filed April 27, 1960
2 Sheets-Sheet 2
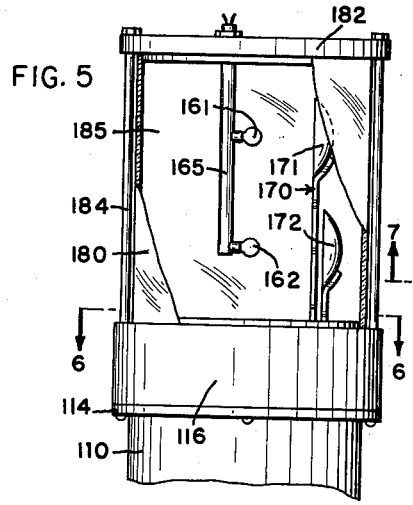
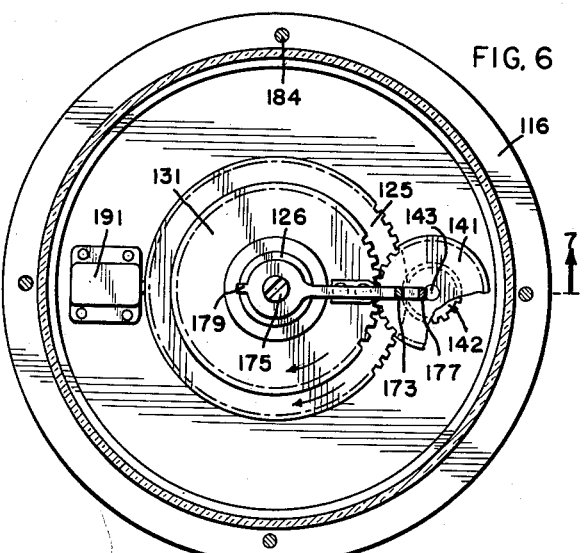
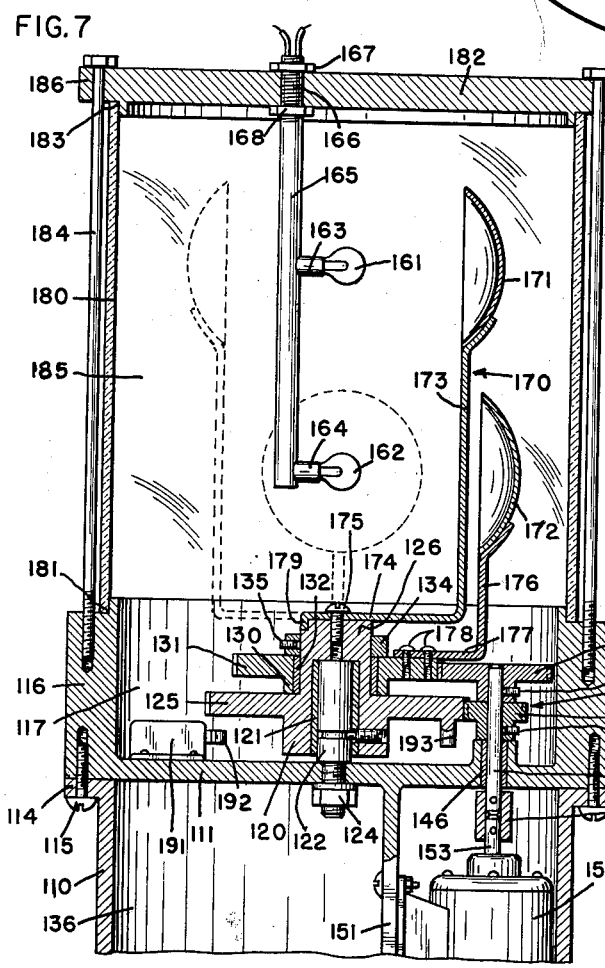
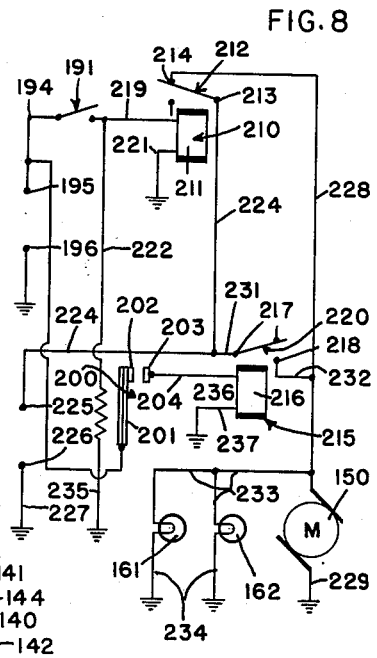
INVENTOR.
GAYLE R. NORBERG
BY
Caswell & Lagaard
ATTORNEYS

United States Patent Office 3,133,263
Patented May 12, 1964

3,133,263
DIRECTION INDICATORS
Gayle R. Norberg, 1432 NE. 5th St.,
Minneapolis 13, Minn.
Filed Apr. 27, 1960, Ser. No. 24,978
8 Claims. (Cl. 340—25)

The herein disclosed invention relates to direction indicators and has for an object to provide a direction indicator for indicating by observation the attitude of a vehicle or fixed point with reference to another vehicle or point.

Another object of the invention resides in providing a direction indicator utilizing two rotating light beams producing flashes forming different flash patterns when viewed from different positions about the indicator.

A still further object of the invention resides in providing an indicator in which the beams rotate at different rates of speed.

An object of the invention resides in providing an indicator in which one beam is rotated at a speed twice that of the other and both rotated in the same direction.

Another object of the invention resides in providing two coaxial, revoluble members, carrying light directors projecting beams of light in directions substantially normal to the axes of said members.

A still further object of the invention resides in providing illuminating means for simultaneously illuminating both of said light directors.

An object of the invention resides in driving one of said revoluble members at a speed of up to ten revolutions per minute and the other at a speed up to twenty revolutions per minute.

Another object of the invention resides in providing a construction in which the light beams are eliminated for a predetermined period of time following the completion of a cycle of flashes.

Other objects of the invention reside in the novel combination and arrangement of parts and in the details of construction hereinafter illustrated and/or described.

In the drawings:

FIG. 1 is an elevational view of a direction indicator illustrating an embodiment of the invention.

FIG. 2 is a plan, sectional, view taken on line 2—2 of FIG. 1 and drawn to a greater scale.

FIG. 3 is an elevational, sectional view taken on line 3—3 of FIG. 2.

FIG. 4 is a cross sectional view taken on line 4—4 of FIG. 3.

FIG. 5 is an elevational view, similar to FIG. 1, of a modification of the invention.

FIG. 6 is a plan, sectional view taken on line 6—6 of FIG. 5 and drawn to a greater scale.

FIG. 7 is an elevational, sectional view taken on line 7—7 of FIG. 6.

FIG. 8 is a wiring diagram of the invention shown in FIGS. 5 through 7.

The construction shown in FIGURES 1 to 4 includes a case 10 having a space 36 within the same and constructed with a bottom 12 and a circumferential wall structure 13 issuing upwardly therefrom. A flange 14 issues outwardly from the upper open end of said wall structure 13. Overlying the case 10 and resting on the flange 14 is a cover plate 11. Screws 15 extend through said flange and are screwed into the cover plate to hold the same firmly attached to the case. The cover plate 11 has issuing upwardly from the marginal portion of the same a sleeve 16. Received in the sleeve 16 is annulus 17 constructed in two halves 58 and 59 and having a flange 18 extending across the upper portion of the same. Screws 19 extend through said flange and are screwed into the sleeve 16 to hold the annulus 17 and flange 18 in position.

Superimposing the cover plate 11 and disposed within the confines of the annulus 17 is a revoluble member 20. This revoluble member is constructed of some suitable insulating material and has a flange 21 engaging the inner surface of annulus 17 and the under surface of the flange 18. This revoluble member has attached to it a ring gear 22 by means of screws 23 which extend through said ring gear and are screwed into the flange 21. The gear 22 rests upon the upper surface of the cover plate 11 and is rotatably mounted with respect to the annulus 17 engaging the inner surface thereof.

Formed in the revoluble member 20 is a parabolic cavity 24 in which is received a parabolic reflector 25. This reflector has a light socket 26 at its inner end and in which is mounted a light bulb 27. Light bulb 27 is located at the focus of reflector 25.

The revoluble member 20 is formed with a bore 28 extending coaxially with reference to the ring gear 22 and the flange 21. In this bore is mounted another revoluble member 30 which has a head 31 and shank 32 received in said bore. A spindle 33 is centrally mounted in the revoluble member 30 and is held attached thereto by means of a set screw 34. Mounted on the spindle 33 immediately below the shank 32 is a slip ring 35. The spindle 33 extends through the cover plate 11 and into the space 36 within the case 10. Mounted on the spindle 33 below the slip ring 35 is a bushing 37 which has a reduced portion 38. Other set screws 39 and 49 hold the said bushing and slip ring 35 rigidly attached to the spindle 33.

For the purpose of rotating the two revoluble members, a power transmission 40 is employed, best shown in FIG. 4. This power transmission includes a gear 41 which is attached to the bushing 37 by means of screws 42. This gear meshes with a spur pinion 43 mounted on a shaft 45 and which is journaled in a bearing 46 formed on the cover plate 11. The pinion 43 meshes with another pinion 44 mounted on a shaft 47 which is journaled in a bearing 48 also formed on the cover plate 11. Shaft 47 extends below the bearing 48 and into the space 36 within the case 10. Pinion 44 also meshes with the ring gear 22. Within the space 36 in case 10 is a motor 50 which is attached to a bracket 51 extending downwardly from the cover plate 11. This motor has a drive shaft 56 which is coupled to the shaft 47 by means of a coupling 57 and serves to drive the pinion 44. By the proper selection of the diameters of the gears 22 and 41 and the pinions 43 and 44, rotor 20 is driven at one rate of speed and rotor 30 is driven at twice the speed of rotor 20 and both rotors being driven in the same direction. Applicant has found that for airplanes the rotor 20 is preferably driven between a speed of one revolution per minute and ten revolutions per minute, the lower range being preferable. Where a low speed is required, the motor 50 would include reduction gearing driving the shaft 56 from the motor shaft, which has not been shown in the drawings.

Formed in the head 31 of rotor 30 is a parabolic cavity 52 and in which is mounted a parabolic reflector 53. This reflector, similar to the reflector 25, is provided with a lamp socket 54 and in which is mounted a light bulb 55. Current for operating these lamps is derived from a suitable source of electrical energy fed to a conductor indicated by the reference numeral 60. This conductor is connected to a brush 38 mounted on a bracket 61 attached to the underside of the cover plate 11. The brush 38 makes electrical contact with the end 63 of spindle 33. Engaging the slip ring 35 is a brush 66 which is slidably mounted in a hole 65 in the revoluble member 20 and which intersects the bore 28. This brush engages a spring 65 which makes contact with the center contact of the light bulb 27 and said brush and urges the brush into contact with the slip ring 35. Attached to the undersurface of the head 31 of revoluble member 30 is a slip ring 69 which is received in an annular groove 68 formed in the underside of the head 31 of revoluble member 30. This slip ring is attached to said head by means of screws 71 which extend through said slip ring and are screwed into the head. The slip ring 69 rests upon the upper surface of revoluble member 20. Formed in the revoluble member 20 and extending through the upper surface of the same is a bore 72 which receives a brush 73 engaging the slip ring 69. A spring 74 disposed within this bore engages the socket 26 and also the brush 73 and makes an electrical connection between said socket and the slip ring. Extending between the lamp socket 54 and the slip ring 69 is a conductor 75 which makes electrical connection therebetween. Formed in the flange 21 of the revoluble member 20 is a bore 77 which extends through the outer surface of said flange. Mounted in this bore is a brush 76 which engages the annulus 17 and which serves as a slip ring. A compression coil spring 78 engages the said brush and also a conductor 79 extending from the end of the bore 77 and to the light socket 26. A conductor 59 attached to the cover plate 11 and to the source of electrical energy serves to conduct current to the sleeve 16 and thereby to light bulbs 27 and 55.

The portion of the apparatus above the cover plate 11 is enclosed by means of a glass enclosure 80. This enclosure is dome shaped in form and has at its lower end a flange 82 resting upon the sleeve 16. A retaining ring 83 screwed on this sleeve holds the enclosure in place.

The method of operation of the invention is as follows: As long as the motor 50 operates, the rotor 20 is driven at a certain rate of speed which, for the purpose of illustration, has been selected as one revolution per minute. Rotor 30 correspondingly operates then at two revolutions per minute. The indicator is oriented so that when the two light bulbs 26 and 25 are directly in vertical alignment the beams emanating from the reflectors 25 and 53 lie in a common, vertical plane. Where the device is mounted on a moving vehicle, such as an airplane, the denoted plane of said light beams is the longitudinal plane of the vehicle and the two reflectors are directing the beams toward the nose of the vehicle. When the indicator is used at a fixed location, the instrument is arranged with the denoted plane extending in a northerly and southerly direction and the light beams directed toward the north. In the latter case, when the rotors are rotated, the following table indicates the type of signal received at various angles with reference to the instrument.

(1) North: Alternate bright (coincidence of beacons) and normal flashes at 30 second intervals.

(2) Northeast: Two normal flashes separated by 3¾ seconds, followed by a normal flash after 26¼ seconds and repeated 30 seconds after the last flash.

(3) East: Two normal flashes separated by 7½ seconds, followed by a normal flash after 22½ seconds, and repeated 30 seconds after the last flash.

(4) Southeast: Two normal flashes separated by 11¼ seconds, followed by another normal flash after 18¾ seconds, repeated 30 seconds after the last flash.

(5) South: Three normal flashes separated by 15 seconds and repeated every minute.

(6) Southwest: Two normal flashes separated by 11¼ seconds, followed by another normal flash after 30 seconds, repeated 18¾ seconds after the last flash.

(7) West: Two normal flashes separated by 7½ seconds, followed by another normal flash after 30 seconds, repeated 22½ seconds after the last flash.

(8) Northwest: Two normal flashes separated by 3¾ seconds, followed by another normal flash after 30 seconds, repeated 26¼ seconds after the last flash.

In FIGS. 5, 6, 7, and 8, a modified form of the invention is disclosed. In this form of the invention, a case 110 is employed having a circular wall structure 113. This wall structure is provided at its upper end with a flange 114 which extends outwardly therefrom. Underlying said flange is a cover plate 111 which has a sleeve 116 extending upwardly from the outer marginal portion thereof. Screws 115 extend through said flange and are screwed into the sleeve 116. By means of this construction, a compartment 117 is formed within the sleeve 116 and above the cover plate 111 and a space 136 within the case 110. Disposed within the space 117 is a revoluble member 120 provided with a bearing 121. A stub shaft 122 has a reduced end 123 which is threaded to receive a nut 124. The reduced end 123 extends through the cover plate 111 and nut 124 screwed on the same clamps the shaft in position. The revoluble member 120 has formed on it a spur gear 125. Extending upwardly from the spur gear 125 is formed on the revoluble member 120 a journal 126. Rotatably mounted on this journal is a revoluble member 130 which has a spur gear 131 formed thereon. A collar 134 mounted on the journal 126 holds the revoluble member 130 from axial movement. This collar is provided with a set screw 135 which engages the journal 126.

For operating the two revoluble members, a power transmission 140 is employed, which includes two gears 141 and 142 mounted upon a drive 143. Set screws 144 and 145 hold these gears attached to the shaft. The gear 141 meshes with the gear 131 and the gear 142 meshes with the gear 125. These gears are so proportioned that the rotor 130 travels at twice the speed of the rotor 120. The shaft 143 is rotatably mounted in a bearing 146 formed on the cover plate 111 and extends into the space 136 within the case 110. A motor 150 mounted on a bracket 151 issuing downwardly from the cover plate 111 drives the shaft 143 through a coupling 152.

For producing the light beams, two light bulbs 161 and 162 are employed which are mounted in sockets 163 and 164. These sockets are carried by a depending tube 165 formed with threads 166 at its upper end. Nuts 167 and 168 screwed on the said tube clamp the same in position, as will be presently described. Operating in conjunction with the light bulbs 161 and 162 are two parabolic reflectors or light directors 171 and 172 which serve as light directing means, indicated by the reference numeral 170. The reflector 171 is mounted on an upright 173 having an arm 174 extending inwardly therefrom. This arm overlies the journal 126 and is attached thereto by means of a screw 175. This arm is keyed to the said journal by means of a key 179. The reflector 172 is mounted on an upright 176 which has an arm 177 overlying the gear 131. Screws 178 passing through this arm are screwed into said gear holding the arm rigidly attached thereto.

The structure above the cover plate 111 is enclosed in a tubular glass enclosure 180. This enclosure is received in a rabbet 181 formed in the sleeve 116. A top plate 182 overlies this enclosure and has a rabbet 183 receiving the upper end of said enclosure. Bolts 184 extending through the marginal portion 186 of the top plate 182 are screwed into the sleeve 116 holding the parts assembled.

In the form of the invention shown in FIGS. 1 to 4, inclusive, it sometimes becomes difficult to determine when the cycle commences or ends. To overcome this disadvantage, the construction is employed, which is shown in FIGS. 5 to 8, inclusive, and by means of which the flashing of the signals is eliminated for a predetermined period of time after each cycle of flashes. This construction utilizes a switch 191 which is disposed in a compartment 117 and is attached to the cover plate 111. This switch has an operating lever 192 which is positioned to be engaged by a cam 193 formed on the underside of the gear 125. The said switch is connected in the circuit shown in FIG. 8. A conductor 194 connects the one end of the switch 191 with one terminal 195 of a suitable source of electrical energy. The other terminal 196 of this source is grounded. In conjunction with the switch 191, a time controlled switch 200 is employed which has a thermostatic element 201 carrying a contact 202. The said switch, further, has a fixed contact 203. In addition, the switch includes an electric heater 204 which, when energized, heats the thermostatic element 201 and opens the circuit through the contacts 202 and 203. In addition to the switch 200, a relay 210 is employed which has a coil 211 and a switch 212 having a moving arm 213 and a fixed contact 214. Another similar relay 215 is employed which has a coil 216 and a switch 205 provided, a movable arm 217, and a fixed contact 218. The switch 192 is connected by means of a conductor 219 to one end of the coil 211 of relay 210, the other end of said coil being grounded through a conductor 221. Conductor 219 is connected by means of a conductor 222 to one end of the heater 204 of the switch 200, the other end of said heater being grounded through a conductor 223. The movable arm 213 of switch 212 of relay 210 is connected by means of a conductor 224 to one terminal 225 of a second source of electrical energy. The other terminal 226 of this source of electrical energy is grounded through a conductor 227. The fixed contact 214 of switch 212 of relay 210 is connected by means of a conductor 228 to one terminal of the motor 150, the other terminal of which is connected to ground through a conductor 229. The movable arm 217 of switch 205 of relay 215 is connected by means of conductor 231 to the conductor 224. The fixed contact 218 of this switch is connected by means of a conductor 232 to the conductor 228. Both of the light bulbs 161 and 162 are connected to conductors 233 which, in turn, is connected to the conductor 228. These bulbs are further connected by means of conductors 234 to ground. The thermostatic element 201 is connected by means of a conductor 235 to the conductor 194. Fixed contact 203 is connected by means of conductor 236 to one end of the coil 216 of relay 215. The other end of this coil is connected by means of a conductor 237 to ground.

The method of operation of the form of the invention shown in FIGS. 5 to 8 is similar to that of the form shown in FIGS. 1 and 4, with the following exceptions:

During normal operation of the direction indicator, the switches 191, 212 and 220 are as shown in FIG. 8. Also, heater 204 is deenergized due to the fact that the switch 191 is normally open, cam 193 being disengaged from arm 192 of switch 191. The strip of bimetal 201 in such position holds contact 202 away from contact 203 and switch 200 is open. Relay 216 is, hence, deenergized and the switch 220 is closed. Current, when the switches are so disposed, flows from the terminal 225 through conductor 224 and conductor 231, through conductor 224, switch 212, and conductor 228 to the motor 150. This motor, being grounded through conductor 229, operates and rotates the gear 125. At the same time, light bulbs 161 and 162, being connected to ground through conductors 234 and to the conductor 228 through conductors 233, are energized and produce the desired beams. As soon as switch 191 is closed, which occurs at the end of the cycle, relay 210 is energized and switch 212 opens. This opens the motor and lamp bulb circuits and the motor stops and the lamps go out, switch 220 still remaining open. At the same time, heater 204 becomes energized and heats the strip of bimetal 201. This causes the bimetal to arch and the contact 202 to move toward the contact 203. Since time is required to make contact between contacts 202 and 203 due to the slow rate of transfer of heat from heater 204 to the strip of bimetal 201, motor 150 ceases to move while the switch 191 is still held open by cam 193. After the lapse of a predetermined length of time, determined by the parameters of the components and the design and material of the strip of bimetal 201, switch 200 closes and the relay 216 is energized. This closes switch 220 and the circuit through the motor 150 and the light bulbs 161 and 162 is reestablished through switch 220 and conductors 231 and 232. Motor 150 then moves cam 193 away from arm 192 of switch 191 and the circuit through the motor 150 and light bulbs is also established through the parallel circuit including switch 212. Before completion of the cycle the strip of bimetal 201 has cooled sufficiently so that switch 200 opens. The switches are now reset to normal and, upon completion of the cycle, the operation is repeated. In this manner, a pause of lesser length than the length of the cycle can be procured to permit of more readily interpreting the signals.

If a pause of a length equal to that of the cycle is desired, the cam 193 can be formed on a gear driven at one-half the speed of gear 125 and of an angular extent with reference to the said gear of substantially one hundred and eighty degrees.

The advantages of the invention are manifest. The indicator can be built at a fairly low cost so that the same could be used on airplanes, boats and other vehicles, as well as at fixed positions. The device is simple in construction and is not apt to get out of order. About the only thing that might go wrong would be that the light bulbs would burn out, but the same could be readily replaced. The device can be run from dry cells, storage batteries, or any common source of electric energy. The signal being visual, no intricate receiving apparatus is necessary to receive the signals.

While the invention has been described as employing visual radiation, other radiation such as ultraviolet radiation, infra-red radiation and electromagnetic radiation may be used. In such cases, receivers capable of receiving the signals would be used. Also, receivers capable of receiving the light signals from the apparatus described may be used in place of depending upon visual observation. Where signals are received by receivers, the period of the cycle might be greatly shortened. Also, if desired, the two signals might have different frequencies to aid in determining when the cycle commenced.

Changes in the specific form of the invention, as herein described, may be made within the scope of what is claimed without departing from the spirit of the invention.

Having described the invention, what is claimed as new and desired to be protected by Letters Patent is:

1. In a direction indicator, a support illuminating means mounted thereon, two juxtaposed light directors illuminated thereby and producing two light beams, means for rotating said directors about coaxial axes at different speeds to produce recurring light flashes exhibiting different light flash patterns when viewed from different positions about said support.

2. In a direction indicator two coaxial revoluble members, two light sources each carried by one of said members, light directors carried by said revoluble members and co-operating with said light sources to produce light beams whose axes are substantially at right angles to the respective axes of rotation of said revoluble members, a driving member and a power transmission between said driving member and revoluble members and driving one of said revoluble members at a speed differing from that of the other.

3. In a direction indicator two coaxial revoluble members, two light sources disposed one above the other, light directors carried by said revoluble members and co-operating with said light sources to produce light beams whose axes are substantially at right angles to the respective axes of rotation of said revoluble members, a driving member and a power transmission between said driving member and revoluble members and driving one of said revoluble members at a speed differing from that of the other.

4. In a direction indicator two coaxial revoluble members, two light sources disposed substantially at the axis of rotation of said revoluble members, light directors carried by said revoluble members and co-operating with said light sources to produce light beams whose axes are substantially at right angles to the respective axes of rotation of said revoluble members, a driving member and a power transmission between said driving member and revoluble members and driving one of said revoluble members at a speed twice that of the other.

5. In a direction indicator a case, two coaxial revoluble members disposed therein, bearing means carried by said case for supporting said members for rotating movement, a gear connected to and driving one of said revoluble members, a gear of lesser diameter connected to and driving the other revoluble member, a drive shaft carried by and journaled in said case gears connected to and driven by said drive shaft, said last named gears meshing with said first named gears, said gears being proportioned to drive said revoluble members at different rates of speed and in the same direction.

6. In a direction indicator, a support, illuminating means mounted thereon, two juxtaposed light directors illuminated by said illuminating means and producing two light beams, means for rotating said light directors about substantially coaxial axes with the axes of the beams lying substantially in a common plane normal to the axes of rotation of said light directors, so that the beams each become alternately visible and invisible when viewed in a direction substantially normal to the axes of the light directors and means for rotating said light directors at different speeds to exhibit different light flash patterns when viewed from different positions about said support.

7. In a direction indicator, a support, illuminating means mounted thereon, two juxtaposed light directors illuminated by said illuminating means and producing two light beams, means for rotating said light directors about substantially coaxial axes with the axes of the beams lying substantially in a common plane normal to the axes of rotation of said light directors, so that the beams each become alternately visible and invisible when viewed in a direction substantially normal to the axes of the light directors and means for rotating said light directors at different speeds and in the same direction to exhibit different light flash patterns when viewed from different positions about said support.

8. In a direction indicator comprising, continuously actuated, illuminating means, two juxtaposed light directors simultaneously illuminated thereby and producing two substantially continuous light beams, means for rotating said directors about substantially vertical coaxial axes and at different speeds to produce periodically visible recurring light flashes exhibiting different light flash patterns to indicate directions when viewed from different positions about said directors.

References Cited in the file of this patent
UNITED STATES PATENTS

| | | |
|---|---|---|
| 1,670,682 | Halvorson et al. | May 22, 1928 |
| 1,993,540 | Brogger | Mar. 5, 1935 |
| 2,118,709 | Lebby | May 24, 1938 |
| 2,699,536 | Roth et al. | Jan. 11, 1955 |
| 2,924,817 | Dawkins et al. | Feb. 9, 1960 |